United States Patent [19]

Conley

[11] Patent Number: 4,633,055
[45] Date of Patent: Dec. 30, 1986

[54] PLASMA CUTTING SYSTEM

[76] Inventor: James A. Conley, 280 Meadow St., Meadville, Pa. 16335

[21] Appl. No.: 713,045

[22] Filed: Mar. 18, 1985

[51] Int. Cl.⁴ ............................................. B23K 15/00
[52] U.S. Cl. .............................. 219/121 PC; 228/49.1; 269/289 MR; 269/56
[58] Field of Search ................. 219/121 PC, 121 PD, 219/121 PB, 121 PX, 121 LC, 121 LD, 121 PM, 158–161; 269/54.4, 56, 289 MR; 228/49 R

[56] References Cited

U.S. PATENT DOCUMENTS

| | | | |
|---|---|---|---|
| 3,889,095 | 6/1975 | Egan | 219/121 LY |
| 4,063,059 | 12/1977 | Brolund et al. | 219/121 PC |
| 4,097,713 | 6/1978 | Dunshee | 219/121 PC |
| 4,431,902 | 2/1984 | Wallen | 219/125.12 |

Primary Examiner—M. H. Paschall
Attorney, Agent, or Firm—Charles L. Lovercheck; Wayne L. Lovercheck; Dale R. Lovercheck

[57] ABSTRACT

The plasma cutting system of the invention includes a constant height plasma arc cutter, a rolling table and a plasma cutter carrying gantry driven from opposite sides. The rolling table is rolled from a loading position where metal sheets are positioned thereon to a cutting position beneath the plasma arc cutter. The plasma arc cutter is held at a constant height above the rolling table. Each metal sheet loaded onto the rolling table is supported on adjustable pins. The entire cutting area is enclosed and vented. The plasma cutter and the rolling table are supported by the cutting system support. A cutter housing supports a transparent curtain, and the transparent curtain encloses the plasma arc cutter. A gantry is supported by the cutter housing, and the gantry supports the plasma cutter. The rolling table includes a table frame, adjustable pins and table wheels. The adjustable pins and the table wheels are connected to the table frame. The adjustable pins extend above and below the pin engaging portion of the table frame. The plasma arc cutter includes a plasma arc cutter member and a cutter positioner. The plasma arc cutter member includes a plasma arc cutting portion and a programmable cutter control. The cutter positioner includes a cutter support and a programmable cutter position controller. The cutter support includes a gantry and a rotatable pinion at each end of the gantry.

17 Claims, 7 Drawing Figures

PLASMA CUTTING SYSTEM

BACKGROUND OF THE INVENTION

This invention relates to a plasma cutting system of improved efficiency and safety. The improvements of the invention each taken alone or in combination add to operator convenience and productivity and provide equipment portability.

Union Carbide Corporation, Linde Division, Technical Sales Manual, January, 1983 entitled "proDUCTor AUTOMATIC SHEET METAL SYSTEM" discloses a computer aided manufacturing system having two parts, a cutting center and an input control terminal. The cutting center consists of a gantry type machine with microprocessor numerical control, a plasma cutting system, one or more down draft cutting tables and a fume-smoke collector.

McNabb in U.S. Pat. No. 3,433,923 and McNabb in U.S. Pat. No. 3,433,922 each discloses an electronic beam welding machine in which an electron beam emitter is heated electrically to provide a focused beam of electrons.

Malmuth et al in U.S. Pat. No. 4,121,087 discloses an apparatus for laser welding which uses power reflected by the surface being welded to control the power input to the weld.

Bateman in U.S. Pat. No. 2,927,992 discloses automatic electric arc welding at a uniform rate along a contoured part.

Takizawa et al in U.S. Pat. No. 4,270,845 and Duruz in U.S. Pat. No. 4,412,120 each discloses a machine for cutting sheet metal by means of a laser beam. In Duruz the sheet metal is placed on a support constituted by a container which moves on a table of the machine while rolling on support balls provided on the table.

Connon et al in U.S. Pat. No. 3,417,222 discloses cutting or drilling nonconducting material with a high energy beam of electrons. The beam is focused into a vacuum work chamber.

Balfanz in U.S. Pat. No. 4,234,777 discloses a programmed welding machine including welding heads carried on a motor driven bridge.

Cecil et al in U.S. Pat. No. 4,010,346 discloses a self-propelled tractor for a welding and cutting apparatus. The tractor has drive and steering wheels.

A common form of metal cutting is on a stationary table requiring the operator to position the metal sheet under the cutter while being exposed to fumes produced during prior cuttings. Such equipment requires loading and cutting in the same location. The present invention improves upon this type of equipment by providing a mobile system including a loading area which is separate from an enclosed cutting area of the machine into which the operator need not enter.

BRIEF DESCRIPTION OF THE INVENTION

These problems of the prior art are overcome by the improved plasma cutting system of the present invention. The fume hazards and other loading difficulties of the prior art are either compensated for or not present in a plasma cutting system in accordance with the present invention.

The plasma cutting system of the invention includes a constant height plasma cutter, a rolling table and cutting system support. The plasma cutter and the rolling table are supported by the cutting system support. The rolling table is adapted to be positioned on the cutting system support at a loading position at a cutting position. The cutting position is beneath the plasma cutter.

In the plasma cutting system of the invention a cutter housing supports a transparent curtain, and the transparent curtain encloses the plasma cutter. A gantry is supported by the cutter housing, and the gantry supports the plasma cutter. The rolling table is adapted to be positioned on the cutting system support at a loading position and at cutting position. The cutting position is beneath the plasma cutter. The rolling table includes a table frame, adjustable pins and table wheels. The adjustable pins and the table wheels are connected to the table frame. The adjustable pins extend above and below the pin supporting channels of the table frame. The plasma cutter includes a constant height plasma arc cutter and a cutter positioner. The plasma arc cutter includes a plasma arc cutting portion and a programmable cutter control. The cutter position includes a cutter support and a programmable cutter position controller. The cutter support includes a gantry and a rotatable pinion at each end of the gantry.

The plasma cutting system of the invention optionally includes an additional rolling table. Each rolling table includes adjustable pins supported on transverse channel members.

In the plasma cutting system of the invention the constant height plasma arc cutter is carried by a gantry driven from opposite sides. The rolling table is loaded in a loading position where the operator positions metal sheets thereon. The operator then rolls the loaded table to a cutting position beneath the plasma arc cutter. The plasma arc cutter is held at a constant height above the rolling table. Each metal sheet loaded onto the rolling table is supported on the adjustable pins. The entire cutting area is enclosed and vented thus protecting the operator from fumes produced during cutting.

BRIEF DESCRIPTION OF THE DRAWINGS

The objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
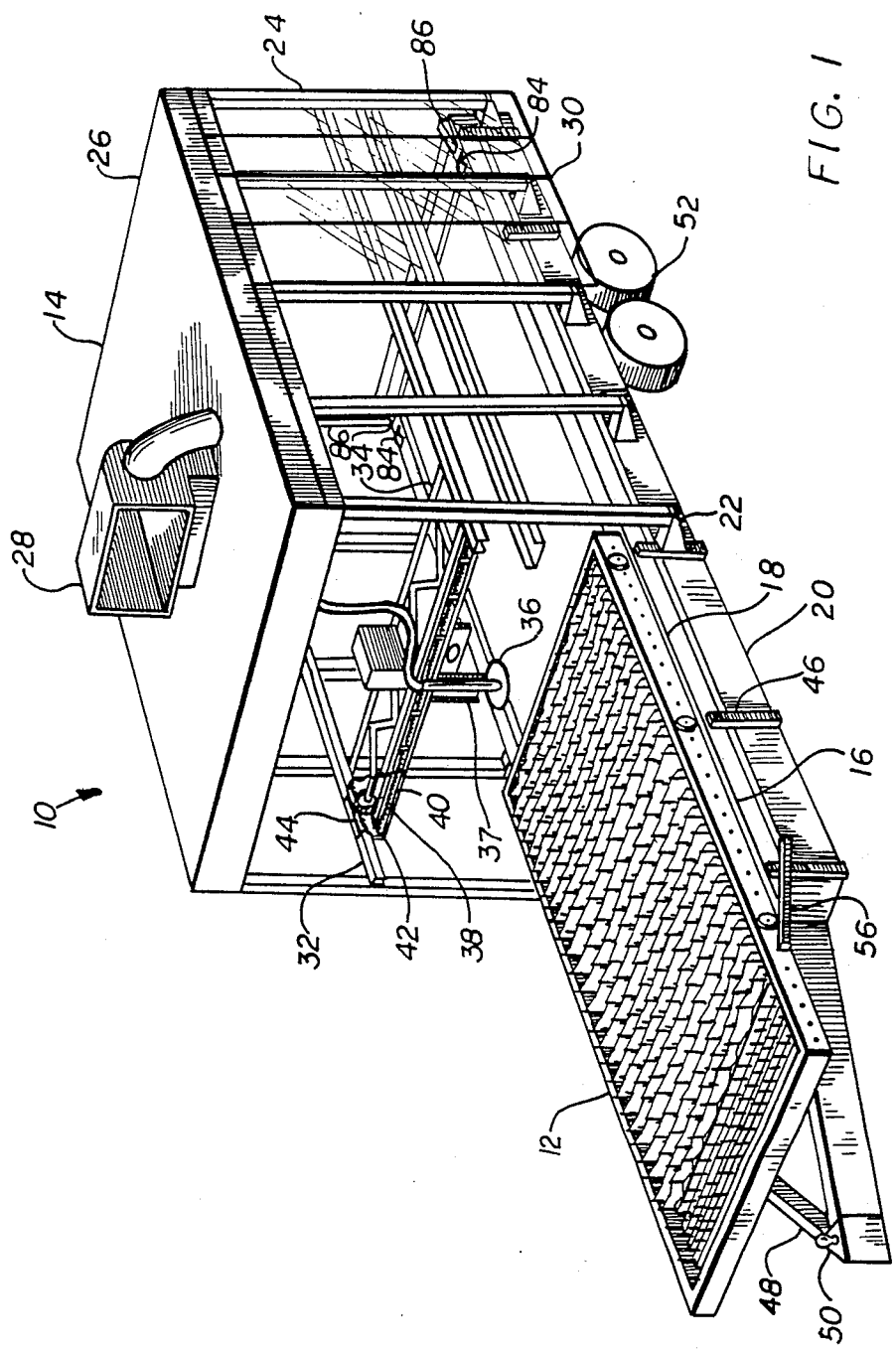
FIG. 1 is a perspective view of a plasma cutting system in accordance with the invention.

The preferred embodiment of the invention is illustrated by way of example in FIGS. 1-7. Referring to the Figures, in which like numerals refer to like portions thereof, FIG. 1 shows a plasma cutting system 10 in accordance with the present invention. The plasma cutting system 10 includes a rolling table 12, and a plasma cutter housing 14. The rolling table 12 rolls on top flange 16 of table support rail 18. Table support rail 18 extends into cutter housing 14. Trailer frame side member 20 is connected to housing base member 22.

Housing base member 22 supports cutter housing corner posts 24. Cutter housing corner posts 24 support cutter housing cover 26. Cutter housing cover 26 supports exhaust fan 28 and transparent welding curtain 30. Cutter housing corner posts 24 are connected to gantry support frame 32. Gantry support frame 32 supports gantry 34. Plasma cutter 36 is of a type familiar to those skilled in the art and is supported by carriage 37 and is carried by gantry 34. The carriage 37 supporting the plasma cutter 36 is moved from side to side on track 38 by a stepper motor 204 which drives shaft 90. Stepper motor drive shaft 40 turns pinions 42 at each side of the gantry frame. The teeth of pinions 42 fit into racks 44 supported by gantry support frame 32 at each side of the housing.

The rolling table 12 rolls on top flange 16 of table support rail 18. Table support rail 18 is supported by table support leg 46. Table support leg 46 is connected to trailer frame side member 20. Trailer frame member 48 is connected to trailer hitch 50 and connected by spring members to wheels 52.

To load the rolling table 12 with a sheet of metal to be cut the operator rolls table 12 to table loading positioner 54 on top flange 16 of table support rail 18. The forward movement of table 12 is stopped by table stop 56 after the table passes table loading positioner 54.

A the table loading position the operator loads a sheet of metal onto table 12. The sheet of metal is supported on adjustable pins 58. The adjustable pine 58 are supported by pin supporting channel members 60. After loading the metal sheet onto the rolling table 12 the table is rolled into the cutting position. The pin support frame 90 including pin support channel member 60 is lifted by hydraulic cylinder 91 to the proper height relative to plasma cutter 36.

Figure 2:
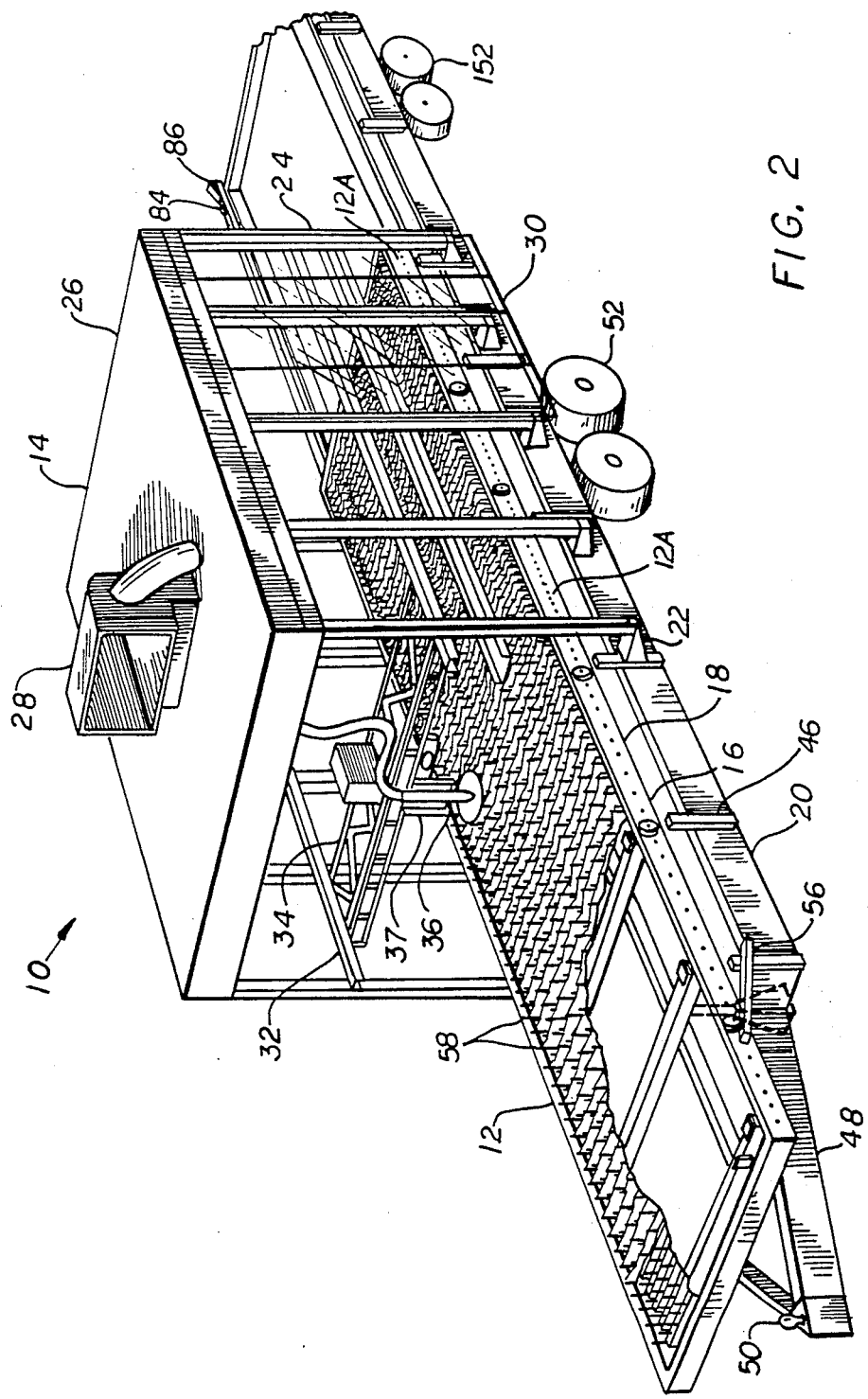
FIG. 2 is a partial cross-sectional view of the table frame of another embodiment of a plasma cutting system in accordance with the invention showing two rolling tables.

In the embodiment of the invention shown in FIG. 2, a longer vehicle having eight wheels is shown. FIG. 2 shows vehicle frame 48' and an elongated roller table with an elongated pin support frame 60' on the table.

Figure 3:
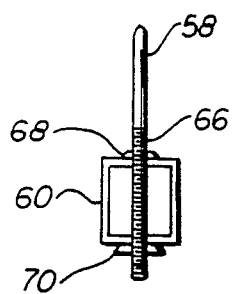
FIG. 3 is a partial side cross-sectional view of a pin supporting channel member of a plasma cutting system in accordance with the invention.
Figure 4:
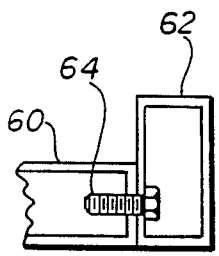
FIG. 4 is a partial end cross-sectional view of a pin supporting channel member of a plasma cutting system in accordance with the invention.
Figure 5:
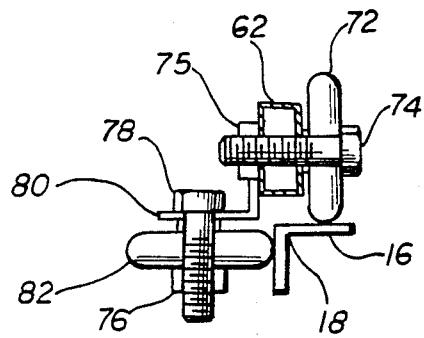
FIG. 5 is a side view of a two table plasma cutting system in accordance with the invention.

With more particular reference to FIGS. 2–4 it is seen that pin supporting channel members 60 are connected to table frame side member 62 by channel nuts 64. The adjustable pins 58, supported by pin supporting channel members 60, have pin threads 66. Pin threads 66 are threaded through upper pin nut 68 above pin supporting channel members 60 and through lower pin nut 70 below pin supporting channel members 60.

Table frame side member 62 is connected to top roller (or wheel) 72 by top roller bolt 74 which has top roller nut 75 fastened thereto. Bottom roller nut 76 is threaded onto the end of the bottom roller bolt 78. Bottom roller bolt 78 extends through the lower flange of table frame rail 80 and bottom roller (or wheel) 82. The upper flange of table frame rail 80 is connected to table frame side member 62.

As the top roller 72 of rolling table 12 rolls on top flange 16 of table support rail 18, the bottom roller 82 rolls against the side flange of table support rail 18. This prevents lateral movement of the table during loading and repositioning.

The rolling table 12 is stopped in cutting position between table cutting positioner 84 and table stop 86. The rearward movement of table 12 is stopped by table stop 86 after the table passes table cutting positioner 84.

Figure 7:
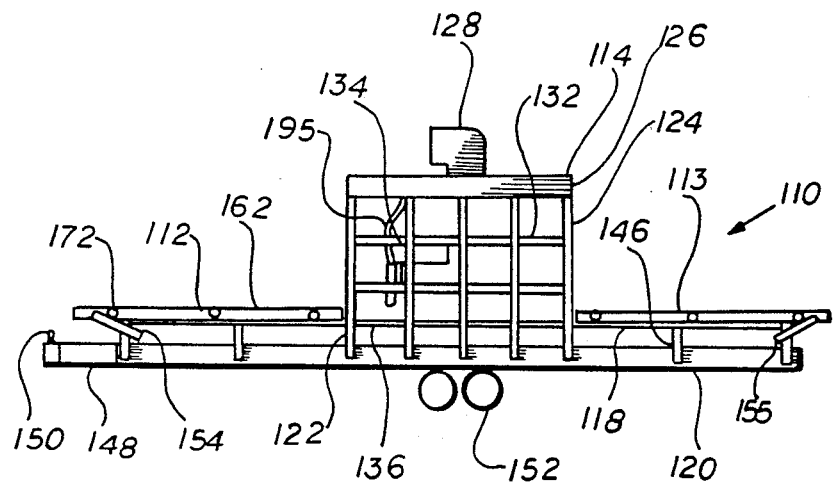
FIG. 7 is a side view of another embodiment of the invention.

FIG. 7 shows a plasma cutting system 110 in accordance with the present invention. The plasma cutting system 110 includes a rolling table 112, and plasma cutter housing 114. Rolling table 112 and rolling table 113 roll on table support rail 118. Table support rail 118 extends into cutter housing 114. Vehicle frame side member 120 is connected to housing base member 122.

Housing base member 122 supports housing corner posts 124. Cutter housing corner posts 124 support cutter housing cover 126. Cutter housing cover 126 supports exhaust fan 128 and transparent welding curtain 120. Cutter housing corner posts 124 are connected to gantry support frame 132. Gantry support frame 132 supports gantry 134. Plasma cutter 136 is carried by gantry 134.

Table support rail 118 is supported by table support leg 146. Table support leg 146 connected to trailer frame side member 120. Trailer frame member 148 is connected to trailer hitch 150 and connected by spring members to wheels 152.

To load rolling table 112 with a sheets of metal to be cut the operator rolls table 112 to table loading positioner 154 on table support rail 118. At the table loading position the operator loads a sheet of metal onto table 112. The sheet of metal is supported on adjustable pins as discussed above in reference to the embodiment of the invention in FIG. 1. After loading the metal sheet onto the rolling table 112 the table is rolled into the cutting position. Similarly, to load rolling table 112 with a sheets of metal to be cut the operator rolls table 112 to table loading positioner 154 on table support rail 118.

Table frame side member 162 is connected to top roller 172. As the top roller 172 of rolling table 112 rolls on table support rail 118, a bottom roller rolls against the side flange of the table support rail as described above. This prevents lateral movement of the table during repositioning.

Figure 6:
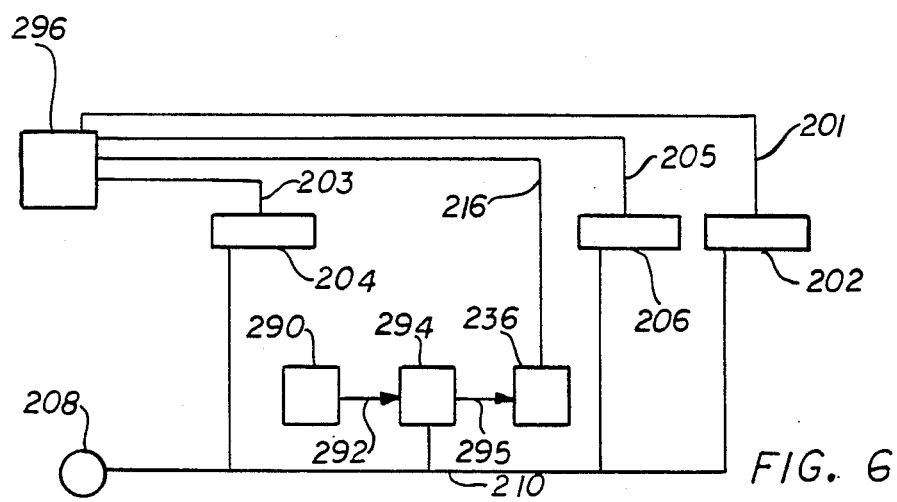
FIG. 6 is a schematic representation of a control system for a plasma cutting system in accordance with the invention.

Like the control current shown in FIG. 6, plasma cutting gas passes from gas storage unit 190 through line 195 to a gas flow controller. The gas flow controller regulates the flow of gas to plasma cutter 136. A programmable computer controls the gas flow controller.

With more particular reference to FIG. 6 it is seen that current source 208 supplies current through line 210 to pinion driving stepper motors 202 and 204 carriage positioning stepper motor 206 and gas flow regulator 294. Plasma cutting gas passes from plasma gas storage unit 290 through flow controller feed line 292 to gas flow controller 294. From gas flow controller 294 gas passes through plasma cutter feed line 295 to plasma cutter 236.

Programmable computer 296 controls the position of the plasma cutter by signalling each of the pinion driving stepper motors 202 and 204 and carriage stepper motor 206 through lines 201, 203 and 205 respectively. Cutting by the plasma cutter is controlled by programmable computer 296 by signals through line 216.

OPERATION

In operation the plasma cutting system of the invention provides safe and efficient cutting of metal sheets. As described above the system includes a plasma cutter, a rolling table pin support panel and cutting system support. The plasma cutter and the rolling table are supported by the cutting system support. The rolling table is adapted to be positioned on the cutting system support at a loading position and at cutting position. The operator positions the sheet metal to be cut on the rolling table while the table is in the loading position near table positioner 56. The operator then rolls the table to the cutting position near table positioner 84. The cutting position is beneath the plasma cutter. A transparent curtain supported by cutter housing encloses the area around the plasma cutter. The curtain protects the operator from fumes generated during cutting. The fumes are vented by the exhaust fan 28.

A gantry is supported by the cutter housing, and the gantry supports the carriage which supports the plasma cutter. The cutting position is beneath the plasma cutter. The position of the plasma cutter is programmed in computer 296. The pinion gear at either end of the gantry is stepper motor driven. Movement of the cutter between the sides is stepper motor driven.

In a preferred embodiment of the invention the table support rail is extended and a second table positioned at the end thereof. A second rolling table is supported on the extended portion of the table support rail. In this embodiment the operator loads one table while the plasma cutter cuts the metal on the other table.

The rolling table 12 includes a table frame, adjustable pins 58 and table wheels (or rollers). The adjustable pins 58 and the table wheels 72, 82 are connected to the table frame. The adjustable pins extend above and below the pin engaging portion of the table frame 16.

During cutting the plasma cutter may cut an adjustable pin. Cut pins are lower than other pins. After loosening the top and bottom nuts, the operator then adjusts the shortened pin upwardly so that the top of the shortened pin is even with the tops of the other pins. The operator then tightens the top nut 68 and bottom nut 70 against the pin supporting channel to secure the shortened pin in this new position. Severely damaged pins may be readily replaced by loosening the top and bottom nuts to take out the damaged adjustable pin to remove the pin from the pin supporting channel. A replacement pin is inserted in place of the damaged pin and the top and bottom nuts are tightened against the pin supporting channel. Preferably, the top of each of the adjustable pins is then substantially in a pin point plane and the pin point plane is substantially parallel to the plane of the table frame.

The operator programs the path of the cut for the plasma cutter which includes a plasma arc cutter and a cutter positioner. The plasma arc cutter includes a plasma arc cutting portion and a programmable cutter control. The cutter positioner includes a cutter support and a programmable cutter position controller. The cutter support includes a carriage, a gantry and a rotatable pinion at each end of the gantry. Driving the gantry on both ends requires much less strength in the frame of the cutter housing than is required by the plasma cutting systems of the prior which are driven from only one side.

While the present invention has been disclosed in connection with the preferred embodiment thereof, it should be understood that there may be other embodiments which fall within the spirit and scope of the invention as defined by the following claims.

The embodiments of the invention in which an exclusive property or privilege is claimed are defined as follows:

1. A plasma cutting system comprising:
   a plasma arc cutting means,
   a generally elongated system frame having a first side and a second side,
   said system frame having a first support area and a second support area,
   spaced upwardly extending laterally and longitudinally spaced posts along side of said second support area,
   a first gantry track attached to said posts along said first side of said second area and a second gantry track attached to said posts along said second side of said area,
   said first gantry track and said second gantry track being spaced above said system frame,
   a rolling table and roller means supporting said rolling table on said generally rectangular elongated system frame,
   work support means on said rolling table,
   cutting support means,
   said cutting support means comprising a laterally extending gantry frame supported on said gantry tracks above said system frame and extending from said first gantry track to said second gantry track,
   moving means for moving said cutting support means laterally and longitudinally of said rolling table,
   said plasma arc cutting means being supported on said cutting support means above said rolling table,
   positioning means on said rolling table for positioning said rolling table on said system frame selectively at a loading position overlying said first area to a cutting position overlying said second area,
   and said spaced posts providing open spaces between them for access to work supported on said rolling table in said cutting position,
   said cutting position being beneath said plasma arc cutting means.

2. The plasma cutting system of claim 1 wherein said system further comprises a cutter housing,
   said cutter housing supporting a transparent curtain, and
   said transparent curtain enclosing said plasma arc cutting means.

3. The plasma cutting system of claim 1 wherein said gantry frame further comprises drive means at each side of said gantry frame engaging said gantry frame supporting means.

4. The plasma cutting system of claim 1 further comprising an additional rolling table on said system frame.

5. The plasma cutting system of claim 1 wherein said rolling table further comprises adjustable vertically extending pins having means to adjust said pins up and down to maintain the upper ends of said pins in a common plane.

6. The plasma cutting system of claim 1 wherein said rolling table further comprises transverse structural members and adjustable pins supported by said transverse structural members.

7. The cutting system recited in claim 1 wherein:
   a rectangular pin frame of, said rolling table has a length approximately equal to the length of said second supporting area,
   adjustable means supporting said pin frame on said table frame for adjusting said pin frame up and down relative to said arc plasma cutting means,
   pins on said pin frame,
   said rolling table being adapted to move on said wheel means on said table frame relative to said arc plasma cutting means with a sheet of metal to be cut supported on said pin frame whereby said arc plasma cutter is moved in a first direction in a plane and in a second direction perpendicular to said first direction and in said plane, said pins being vertically extending members supported on said pin frame and adapted to support said sheet moving said sheet up and down toward and away from said arc plasma cutting means.

8. The plasma arc cutting system of claim 7 wherein said wheel means further comprises table support wheels and table guide wheels, said table support wheels and said table guide wheels being connected to said table frame means.

9. The plasma arc cutting system of claim 8 wherein the axis of rotation of said table support wheels is perpendicular to the axis of rotation of said table guide wheels whereby said table support wheels are guided on said table frame.

10. The plasma arc cutting system of claim 9 wherein the top of each of said adjustable pins are substantially in a common plane and said plane is substantially parallel to the plane of the upper surface of said table frame means.

11. The combination of claim 10 wherein said cutting system support means further comprises plasma cutter system support wheels, said plasma cutting system support wheels supporting said plasma cutter on said system for movement in a plane equally parallel to said plasma arc cutting system.

12. A mobile plasma arc cutting system comprising: a system frame, said system frame having a front end, a rear end, a first side and a second side, and ground engaging wheels on said system frame, said system frame having a front end, a rear end, a first side and a second side, and ground engaging wheels on said system frame, a plasma arc cutting means, a rolling table and, a pin support frame, pin means on said pin support frame extending vertically therefrom and adapted to support a plate like member, means for adjusting said pin support frame up and down to position said plate like member relative to said arc cutting means, a gantry frame, means supporting said gantry frame on said system frame spaced upward from said system frame, supporting means supporting said plasma arc cutting means, said supporting means comprising longitudinally and laterally movable means on said gantry frame for moving said plasma arc cutting means relative to said plate like member, said rolling table being adapted to be selectively positioned on said system frame at a loading position out from under said gantry frame and at cutting position on said system frame, in a space below said gantry frame, said cutting position being beneath said plasma arc cutting means, said rolling table extending substantially from said first side to said second side of said system frame, said rolling table being movable substantially from said front end to said rear end of said system frame.

13. The plasma arc cutting system of claim 12 wherein said system further comprises a cutter housing, said cutter housing supporting a transparent curtain, said transparent curtain enclosing said space between said gantry frame.

14. The plasma arc cutting system of claim 12 further comprising two said tables disposed in tandem with one another and said system frame has two locking positions.

15. The plasma arc cutting system of claim 12 wherein said wheel means further comprises table support wheels and table guide wheels, said table support wheels and table guide wheels are connected to said table frame means and wherein the axis of rotation of said table support wheels is perpendicular to the axis of rotation of said table guide wheels whereby said table frame is guided on said table frame.

16. The plasma arc cutting system of claim 15 wherein said plasma arc cutter comprising programmable cutter control means, said longitudinally and laterally moving means comprising a rotatable pinion at each end of said gantry and a gear rack supported on each said support frame engaged by said pinion.

17. A mobile plasma cutter comprising a vehicle frame having a hitch end and a rear end, ground engaging wheels on said frame, spaced table support frame means on said vehicle for a vehicle frame extending substantially from said hitch end to said rear end, a rolling table having a table frame, top rollers on said table frame engaging said table support rails supporting said rolling table from movement relative to said vehicle frame from said hitch end toward said rear end, a pin support frame supported on said rolling table, said pin support frame being generally of equal area to said rolling table, said pin support frame having an adjustable pin supported thereon and extending upwardly and adapted to support a metal sheet to be cut, hydraulic lifting means on said rolling table frame for lifting said pin support frame relative to said table frame, a cutter housing, said cutter housing having vertical supports attached thereto and attached to said vehicle frame, a gantry support frame, said gantry support frame comprising two spaced tracks, each of said tracks being supported on said vertical support means of said cutter housing, a gantry frame, roller means supporting said gantry frame on said gantry frame support, pinion drive gantry frame motor means on said gantry frame, rack means on said housing extending towards said rear end of said vehicle frame, pinion means operably connected to said gantry frame motor means for driving said gantry frame along said housing frame, plasma cutter means on said gantry frame, computer control means connected to said stepping motor for controlling the position of said carriage, said gantry frame on said carriage and said plasma cutter on said gantry frame.

* * * * *